(12) United States Patent
Bates

(10) Patent No.: US 8,777,120 B2
(45) Date of Patent: Jul. 15, 2014

(54) HYDRONIC RADIANT FLOORING HEATING SYSTEM

(75) Inventor: Todd W. Bates, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1710 days.

(21) Appl. No.: 11/404,963

(22) Filed: Apr. 15, 2006

(65) Prior Publication Data

US 2007/0257124 A1 Nov. 8, 2007

(51) Int. Cl.
*F24D 5/10* (2006.01)

(52) U.S. Cl.
USPC .............. 237/69; 237/43; 165/56; 165/49; 219/529

(58) Field of Classification Search
USPC .......... 237/69, 43; 165/56, 49, 171; 219/529; 138/153; 52/690
See application file for complete search history.

(56) References Cited

U.S. PATENT DOCUMENTS

| | | | | |
|---|---|---|---|---|
| 2,603,458 A | * | 7/1952 | Graham, Jr. | 165/56 |
| 3,053,509 A | * | 9/1962 | Bartels et al. | 165/56 |
| 3,280,530 A | * | 10/1966 | Rothenbach | 52/838 |
| 4,338,994 A | * | 7/1982 | Hewing et al. | 165/49 |
| 4,782,889 A | | 11/1988 | Bourne | |
| 6,152,377 A | | 11/2000 | Friedrich | |
| 6,220,523 B1 | | 4/2001 | Friedrich | |
| 6,330,980 B1 | | 12/2001 | Friedrich | |
| 6,755,001 B2 | * | 6/2004 | Eaton | 52/506.06 |
| 2004/0050945 A1 | * | 3/2004 | Bernhardt | 237/69 |
| 2004/0256479 A1 | * | 12/2004 | Meirana et al. | 237/69 |

* cited by examiner

*Primary Examiner* — Avinash Savani
(74) *Attorney, Agent, or Firm* — Steven Bennett

(57) ABSTRACT

A hydronic radiant flooring heating system includes a pipe having pipe sections, and a grid of a thermally conductive material. The pipe sections are arranged substantially parallel to one another along a first axis, where there is a second axis perpendicular to the first axis. The pipe is to carry a heated liquid to radiantly heat a flooring under which the pipe is situated. The grid is situated relative to the sections. A portion of the grid is positioned substantially parallel to the second axis, and has an increased gauge to provide for lateral heat flow from the sections along the second axis. Heating of the flooring under which the pipe and the grid are situated is substantially uniform at least partially due to the increased gauge of the portion of the grid positioned substantially parallel to the second axis, while permitting wider spacing between adjacent of the pipe sections.

16 Claims, 4 Drawing Sheets

HYDRONIC RADIANT FLOORING HEATING SYSTEM

FIELD OF THE INVENTION

The present invention relates generally to radiant flooring heating systems, and more particularly to hydronic radiant flooring heating systems.

BACKGROUND OF THE INVENTION

Radiant flooring heating systems have been employed in office, industrial, as well as residential environments. Radiant flooring heating systems generally work by disposing heating elements within the flooring of a building. The heat from the heated elements radiate through the floor, heating the space of the building above the flooring. In many instances, radiant flooring heating systems can provide greater comfort and energy efficiency as compared to forced-air and other types of heating systems.

One type of radiant flooring heating system is the hydronic radiant flooring heating system. In a hydronic radiant flooring heating system, a pipe, piping, a tube, or tubing, disposed under the floor carries heated liquid. The pipe is disposed under the floor in a serpentine manner, such that different sections of the pipe are positioned near one another. The heated liquid, which may be water or another type of liquid, radiates heat through the floor, heating the space of the building above the flooring. Hydronic radiant flooring systems can be powered by gas, oil, electricity, or solar energy to heat the liquid, making them flexible and economical.

A downside to hydronic radiant flooring heating systems is that the pipe sections generally have to be positioned relatively close together to ensure uniform heating of the flooring, which is typically required for comfort reasons. However, positioning the pipe sections close together results in relatively large lengths of piping being needed to construct a hydronic radiant flooring system. Increasing the lengths of the piping results in greater labor and material costs. Failure rates of piping also increase as the length of the piping increases. Because the piping is embedded within concrete, making repairs on the piping in case of failure is difficult and expensive to accomplish.

Furthermore, extended piping lengths can cause pressure drops from the point of entry of the liquid into the pipe to the most distant point of the pipe at which the liquid is carried. Such pressure drops can result in the hydronic radiant flooring heating system performing inefficiently. A limited solution is to increase the diameters of the pipe, but doing so increases the cost of the hydronic radiant flooring heating system, and further requires larger turning radii of the pipe during installation in a serpentine manner.

For these and other reasons, therefore, there is a need for the present invention.

SUMMARY OF THE INVENTION

The present invention relates to a hydronic radiant flooring heating system. A hydronic radiant flooring heating system of one embodiment of the invention includes a pipe having a number of pipe sections and a grid of a thermally conductive material. The pipe sections are arranged substantially parallel to one another along a first axis, where there is a second axis perpendicular to the first axis. The pipe sections are to carry a heated liquid to radiantly heat a flooring under which the pipe sections are situated. The grid is situated relative to the pipe sections. A portion of the grid is positioned substantially parallel to the second axis, and has an increased gauge to provide for lateral heat flow from the pipe sections along the second axis. Heating of the flooring under which the pipe sections and the grid are situated is thus substantially uniform at least partially due to the increased gauge of the portion of the grid positioned substantially parallel to the second axis.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1A:
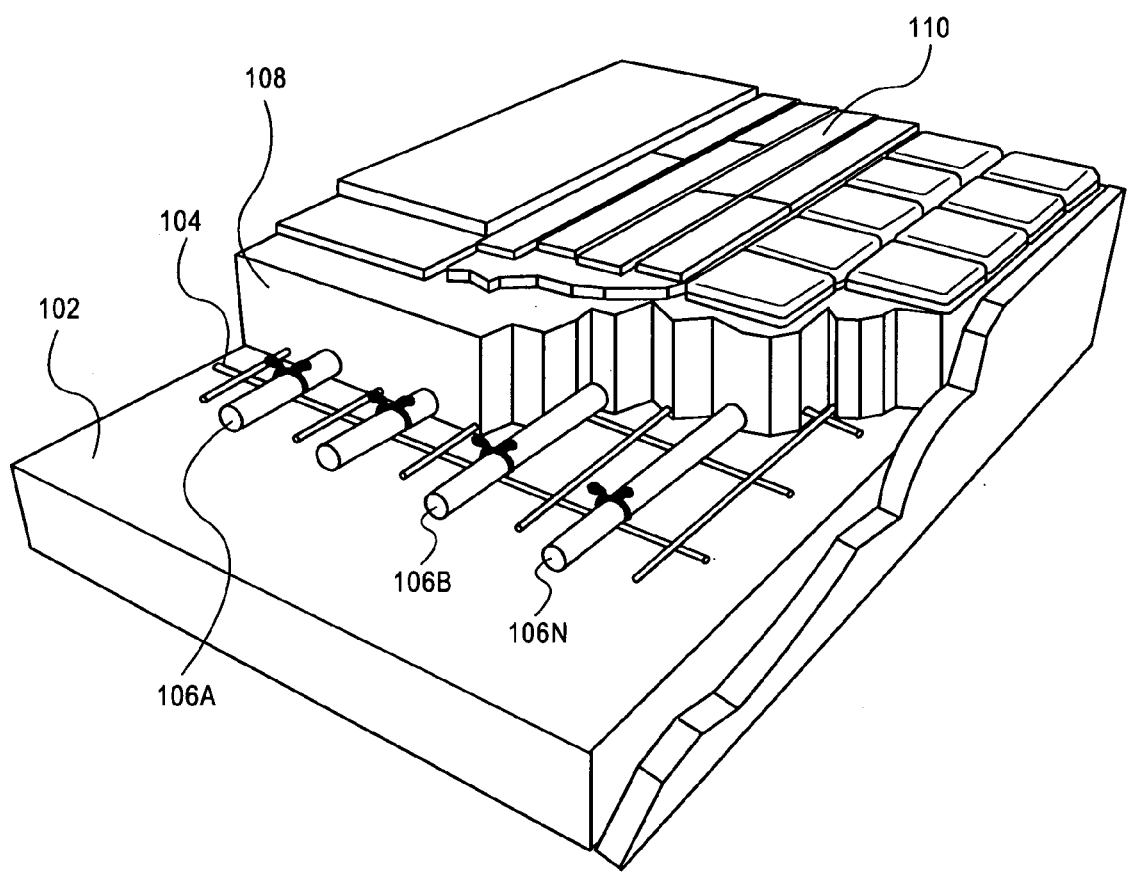
FIGS. 1A and 1B are diagrams of a radiant heating flooring system installed within flooring, in conjunction with which embodiments of the invention may be practiced.
Figure 1B:
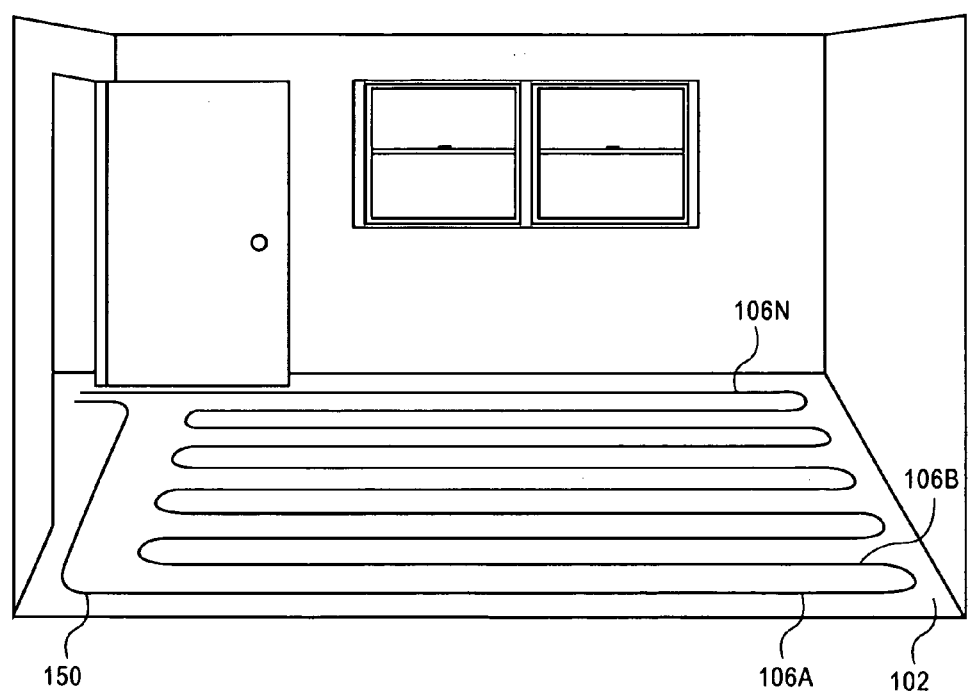

FIGS. 1A and 1B show a typical radiant heating flooring system installed within flooring, in conjunction with which embodiments of the invention may be practiced. In FIG. 1A, a grid 104 is positioned on a sub-floor 102. A number of pipe sections 106A, 106B, . . . , 106N, collectively referred to as the pipe sections 106, are secured to the grid 104. The pipe sections 106 are part of the same pipe, as is described later in the detailed description in relation to FIG. 1B. The pipe sections 106 may also be referred to as piping sections, tube sections, or tubing sections. As such, the pipe of which the pipe sections are a part may be correspondingly referred to as a piping, a tube, or a tubing.

Concrete 108 is positioned around the pipe section 106 and the grid 104. For instance, the concrete 108 may be positioned in a wet-installation manner, also known as a "wet install," in which the concrete 108 in semi-liquid form is poured onto the pipe sections 106 and the grid 104, and then allowed to dry. Finally, flooring 110 is installed over the concrete 108. The flooring 110 may be tile, wood, carpeting, or another type of flooring.

Heated liquid is caused to flow through the pipe sections 106. Heat conducts from the pipe sections 106 up through the flooring 110, resulting in heating of the space over the flooring 110. The heated liquid may be water, or another type of heated liquid. The liquid may be forcibly and actively pushed through the pipe sections 106, by using a motor or another mechanism, or it may be passively pushed through the pipe sections 106, via thermal effect. In either situation, the space over the flooring 110 is heated via radiant heating effect from the heat emanating from the pipe sections 106.

In FIG. 1B, it is depicted how the different pipe sections 106 are part of the same pipe 150 mounted on the sub-floor 102. The grid 104 is not shown in FIG. 1B for illustrative clarity. The pipe 150 is positioned in a serpentine manner such that it substantially covers the entire area of the sub-floor 102. The different pipe sections 106 of the pipe 150 are at least substantially parallel to one another.

Figure 2:
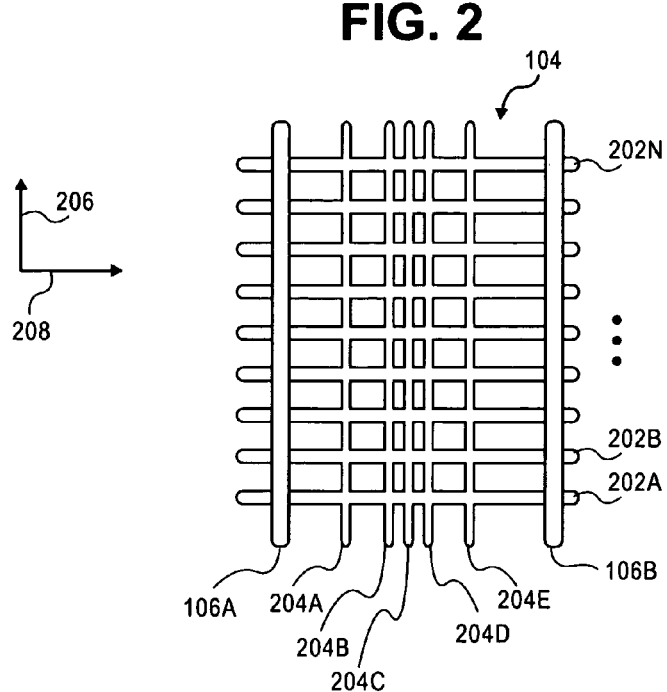
FIG. 2 is a diagram of a grid that is used in conjunction with a radiant heating flooring system, according to an embodiment of the invention.

FIG. 2 shows the grid 104 for a radiant heating flooring system, according to an embodiment of the invention. Two pipe sections 106A and 106B are depicted in FIG. 2 as representative of all the pipe sections 106 within the radiant heating flooring system. The pipe sections 106A and 106B are arranged substantially parallel to one another along a first axis 206. A second axis 208 is perpendicular to the first axis 206.

The grid 104 includes a number of members 202A, 202B, ..., 202N, collectively referred to as the members 202, and a number of members 204A, 204B, 204C, 204D, and 204E, collectively referred to as the members 204. The members 202 make up a first portion of the grid 104, and are positioned substantially parallel to the second axis 208. The members 202 are made of a thermally conductive material, such as steel, or another thermally conductive material.

The members 202 have an increased gauge, as compared to such members of a grid for a radiant flooring system in accordance with the prior art, and/or as compared to the members 204. The increased gauge of the members 202 provides for lateral heat flow from the pipe sections 106A and 106B along the second axis 208. As a result, heating of the flooring under which the pipe sections 106A and 106B and the grid 104 are situated is substantially uniform, at least partially due to this increased gauge of the members 202. Furthermore, the lateral heat flow along the members 202, as a result of the increased gauge of the members 202, permits wider spacing between the adjacent pipe sections 106A and 106B than would otherwise be able to be accomplished to ensure that the heating of the flooring is substantially uniform.

The members 204 in one embodiment are also made of a thermally conductive material, either the same as or different than the thermally conductive material of the members 202. The members 204 make up a second portion of the grid 104. There is more than one of the members 204. The members 204 are positioned substantially parallel to one another along the first axis 206. Furthermore, they are positioned substantially distant from the pipe sections 106A and 106B. That is, as can be seen in FIG. 2, the most distant position from the pipe sections 106A and 106B is the position halfway between the pipe sections 106A and 106B. The members 204 are positioned in this particular embodiment so that they are concentrated around this halfway position.

As depicted in FIG. 2, there are five of the members 204, as one example. The middle-most member 204C is positioned halfway between the pipe sections 106A and 106B. The two members 204B and 204D immediately to either side of the middle-most member 204C are positioned away from the middle-most member 204C by a first distance. The two members 204A and 204E farthest from the middle-most member 204C are positioned away from the members 204B and 204D, respectively, by a second distance that is greater than the first distance.

The members 204 in this embodiment further contribute to the heating of the flooring being substantially uniform. Heat that laterally travels from the pipe sections 106A and 106B over the members 202 along the second axis 208 then longitudinally travels over the members 204 along the first axis 206. Thus, this longitudinal heat flow along the members 204, as a result of the presence of a number of members 204 being positioned distant from the pipe sections 106A and 106B, also permits wider spacing between the adjacent pipe sections 106A and 106B than would otherwise be able to be accomplished to ensure that the heating of the flooring is substantially uniform.

The embodiment of FIG. 2 has been described in relation to the same grid 104 to which the pipe sections 106 are secured during installation of the hydronic radiant flooring heating system. However, in another embodiment, the grid 104 may be a different grid than that to which the pipe sections 106 are secured during installation of the heating system. The amount by which the gauge of the members 202 of the grid 104 is increased, and/or the number and positioning of the members 204 of the grid 104 distantly from the pipe sections 106A and 106B, may be determined using appropriate heat transfer modeling, to ensure that the heating of the flooring is substantially uniform, even with the pipe sections 106A and 106B being positioned relatively wide apart.

It is noted that the grid 104 in at least some embodiments of the invention serves two purposes. First, it is a thermal conductor, as has been described. Second, it is a reinforcement to the concrete 108 that is ultimately poured onto the grid 104 and the pipe sections 106. That is, whereas in the prior art the grid 104 only serves to act as reinforcement to the concrete 108, in at least some embodiments of the invention, the grid 104 also acts as a thermal conductor, in addition to serving as a concrete reinforcement.

Figure 3A:
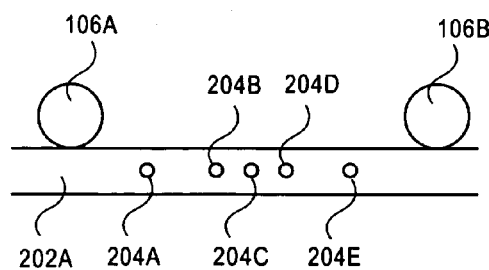
FIG. 3 is a front-view diagram and a side-view diagram, respectively, of the grid of FIG. 2, according to an embodiment of the invention.
Figure 3A:
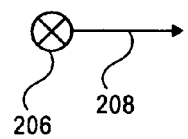
Figure 3B:
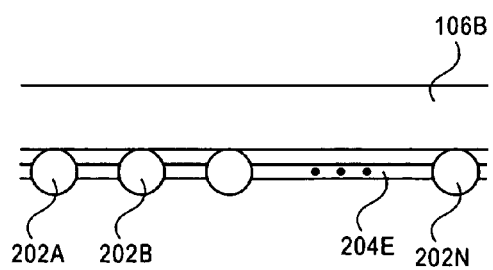
Figure 3B:
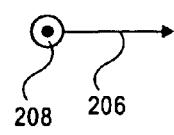

FIGS. 3A and 3B show a front view and a side view, respectively, of the grid 104 of FIG. 2, according to an embodiment of the invention. In FIG. 3A, the first axis 206 is directed perpendicular into the sheet of the figure as shown. By comparison, in FIG. 3B, the second axis 208 is directed perpendicular out of the sheet of the figure as shown. FIGS. 3A and 3B show that in one embodiment, the gauge, or diameter, of the members 202 is greater than the gauge, or diameter, of the members 204.

Figure 4A:
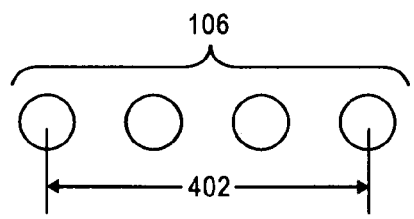
FIGS. 4A and 4B are diagrams depicting how employing a grid in accordance with an embodiment of the invention permits wider-apart spacing of the pipe sections of a radiant heating flooring system while still ensuring substantially uniform floor heating.
Figure 4B:
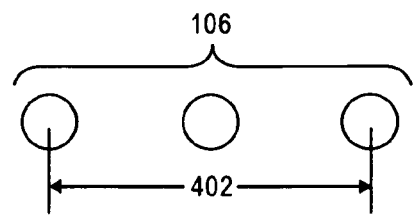

FIGS. 4A and 4B depict how employing a grid 104 in accordance with embodiments of the invention permits wider spacing between adjacent of the pipe sections 106, while still ensuring that the heating of the flooring is substantially uniform, according to an embodiment of the invention. The grid 104 is not depicted in FIGS. 4A and 4B for illustrative clarity, however. FIG. 4A shows conventional arrangement and positioning of the pipe sections 106 over a distance 402 that may be employed to provide for substantially uniform floor heating, where a grid other than the grid 104 in accordance with embodiments of the invention is used. By comparison, FIG. 4B shows arrangement and positioning of the pipe sections 106 over the same distance 402 that may be employed to provide for substantially uniform floor heating, where the grid 104 in accordance with embodiments of the invention is used.

In FIG. 4A, four pipe sections 106 are required to provide for substantially uniform floor heating over the distance 402. By comparison, in FIG. 4B just three pipe sections 106 are required to provide for substantially uniform floor heating over the distance 402. That is, the pipe sections 106 are spaced wider apart in FIG. 4B than in FIG. 4A, even though substantially uniform floor heating is still ensured in FIG. 4B. This is because employment of the grid 104, in accordance with an embodiment of the invention as has been described, ensures such substantially uniform floor heating by using less piping (i.e., having wider-apart pipe sections 106). That is, the lateral heat flow of the members 202 of the grid 104 and/or the longitudinal heat flow of the members 204 of the grid 104 ensures that heat radiates through the flooring in a substantially uniform manner, even where the pipe sections 106 are spaced wider apart. If the pipe sections 106 were spaced wider apart as in FIG. 4B without employing the grid 104 according to an embodiment of the invention, then substantially uniform floor heating would not result.

Figure 5:
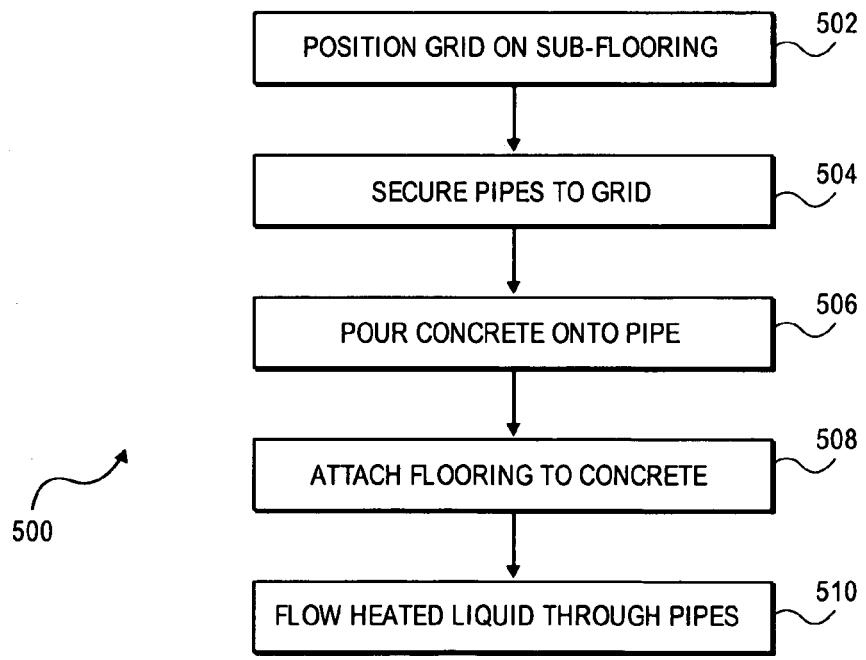
FIG. 5 is a flowchart of a method, according to an embodiment of the invention.

FIG. 5 shows a method 500 to construct and use a hydronic radiant flooring heating system as has been described, according to an embodiment of the invention. The method of FIG. 5 is described in relation to the structure of FIG. 1. The grid 104 is initially secured to the sub-flooring 102 (502). Next, the pipe 150 is secured to the grid 104 in one embodiment (504), and concrete 108 is poured around the pipe 150, consistent with a wet-installation approach, and allowed to dry (506). Because the grid 104 substantially parallel to the pipe 150 has a greater gauge, the pipe 150 can be spaced farther apart than in the prior art, while still ensuring substantially uniform flooring heating. Thereafter, a final flooring 110 is attached or otherwise positioned over the concrete 108 (508). Heated liquid is then caused to flow through the pipe 150 (510), to realize radiant flooring heating.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A hydronic radiant flooring heating system comprising:
   a pipe having a plurality of pipe sections arranged substantially parallel to one another along just a first axis, a second axis perpendicular to the first axis, the pipe to carry a heated liquid to radiantly heat a flooring under which the pipe is situated; and
   a grid of a thermally conductive material situated relative to the pipe sections, the grid having a first portion substantially parallel to one another along the first axis and a second portion substantially parallel to one another along the second axis, the first portion of the grid having a first spacing that is less than a second spacing of the second portion of the grid, such that heating of the flooring under which the pipe and the grid are situated is substantially uniform,
   wherein the heating of the flooring directly over the pipe sections results from heat thermally conducting upwards from the pipe,
   wherein the heating of the flooring not directly over any of the pipe sections results from heat thermally conducting from the pipe sideways along the second portion of the grid and then upwards from both the first portion of the grid and the second portion of the grid,
   and wherein the first spacing being closer than the second spacing helps ensure the heating of the flooring not directly over any of the pipe sections.

2. The hydronic radiant flooring heating system of claim 1, wherein the first spacing of the first portion of the grid is non-uniform, such that the first spacing is closest together farthest away from the pipe sections and is widest apart closest to the pipe sections.

3. The hydronic radiant flooring heating system of claim 2, wherein the second spacing of the second portion of the rid is uniform.

4. The hydronic radiant flooring heating system of claim 1, wherein the pipe is attached to the grid during construction of the heating system, the grid serving to hold the pipe in place during construction of the heating system.

5. The hydronic radiant flooring heating system of claim 1, further comprising concrete poured onto the pipe and the grid in a wet-installation manner, the flooring residing over the concrete.

6. The hydronic radiant flooring heating system of claim 1, wherein the thermally conductive material of the grid is steel.

7. A grid for a hydronic radiant flooring heating system comprising:
   a plurality of first members of a thermally conductive material arranged substantially parallel to one another along a first axis, a heated liquid-carrying pipe of the hydronic radiant flooring heating system having a plurality of pipe sections also arranged substantially parallel to one another along the first axis, the first members having a first spacing between which adjacent of the first members are separated from one another; and
   a plurality of second members of the thermally conductive material arranged substantially parallel to one another along a second axis intersecting the first axis, the second members having a second spacing between which adjacent of the second members are separated from one another,
   wherein heating of flooring directly over the pipe sections results from heat thermally conducting upwards from the pipe sections,
   wherein the heating of the flooring not directly over any of the pipe sections results from heat thermally conducting from the pipe sections sideways alone the second members and then upwards from both the first members and the second members,
   wherein the first spacing is closer together than the second spacing, to help ensure the heating of the flooring not directly over any of the pipe sections.

8. The grid of claim 7, wherein the first spacing of the first members member is non-uniform, such that the first spacing is closest together farthest away from the pipe sections and is widest apart closest to the pipe sections.

9. The grid of claim 8, wherein the second spacing of the second members is uniform.

10. The grid of claim 7, wherein the pipe is attached to the grid during construction of the heating system, the grid serving to hold the pipe in place during construction of the heating system.

11. The grid of claim 7, wherein the thermally conductive material is steel.

12. A method comprising:
    positioning a grid of a thermally conductive material on a sub-flooring; and
    securing a pipe having a plurality of pipe sections to the grid, the pipe sections arranged substantially parallel to one another along a first axis, the pipe to carry a heated liquid to radiantly heat a flooring under which the pipe is situated,
    wherein the grid a first portion substantially parallel to one another along the first axis and a second portion substantially parallel to one another along a second axis perpendicular to the first axis, the first portion of the grid having a first spacing that is less than a second spacing of the second portion of the grid, such that heating of the flooring under which the pipe and the grid are situated is substantially uniform, wherein the heating of the flooring directly over the pipe sections results from heat thermally conducting upwards from the pipe, wherein the heating of the flooring not directly over any of the pipe sections results from heat thermally conducting from the pipe sideways along the second portion of the grid and then upwards from both the first portion of the grid and the second portion of the grid, and wherein the first spacing being closer than the second spacing helps ensure the heating of the flooring not directly over any of the pipe sections.

13. The method of claim 12, wherein the first spacing of the first portion of the rid is non-uniform such that the first spacing is closest to ether farthest away from the pipe sections and is widest apart closest to the pipe sections.

14. The method of claim 13, wherein the second spacing of the second portion of the rid is uniform.

15. The method of claim 12, further comprising pouring concrete onto the pipe and the gird in a wet-installation manner.

16. The method of claim 12, wherein the thermally conductive material of the grid is steel.

* * * * *